(12) United States Patent
Eybergen et al.

(10) Patent No.: US 9,074,524 B2
(45) Date of Patent: Jul. 7, 2015

(54) AIR SUPPLY SYSTEM WITH TWO-STAGE ROOTS BLOWER

(75) Inventors: William N. Eybergen, Harrison Township, MI (US); John G. Walker, Clarkston, MI (US)

(73) Assignee: Eaton Corporation, Cleveland, OH (US)

( * ) Notice: Subject to any disclaimer, the term of this patent is extended or adjusted under 35 U.S.C. 154(b) by 629 days.

(21) Appl. No.: 13/315,799

(22) Filed: Dec. 9, 2011

(65) Prior Publication Data

US 2013/0146035 A1   Jun. 13, 2013

(51) Int. Cl.
| | |
|---|---|
| F02B 33/00 | (2006.01) |
| F02B 33/44 | (2006.01) |
| F01D 15/10 | (2006.01) |
| F02D 29/06 | (2006.01) |
| F04C 18/16 | (2006.01) |

(Continued)

(52) U.S. Cl.
CPC ................ *F02B 33/38* (2013.01); *F02B 39/10* (2013.01); *F04D 25/06* (2013.01); *F04D 25/0606* (2013.01); *F04C 18/126* (2013.01); *H01M 8/04089* (2013.01); *F04C 23/001* (2013.01); *F04C 23/02* (2013.01); *F02B 29/0475* (2013.01); *Y02T 10/146* (2013.01)

(58) Field of Classification Search
CPC .......... F02B 33/38; F02B 39/04; F02B 39/10; F02B 29/0475; F04C 23/001; F04C 23/02; F04C 18/16; F04C 18/126; F04D 25/06; F04D 25/0606; H01M 8/04089; F02D 29/06; F01D 15/10; F01D 15/12

USPC ........................ 123/561, 559.1, 559.3, 565; 60/607–608; 290/52, 40 B, 40 C; 418/9, 418/83, 179, 201.1, 203, 270; 417/243, 417/410.4; 429/17, 455
IPC .............. F04C 18/18,18/16; F02B 39/04, 39/06
See application file for complete search history.

(56) References Cited

U.S. PATENT DOCUMENTS

| | | | | |
|---|---|---|---|---|
| 1,907,346 | A | * | 5/1933 | Drysdale .......................... 418/9 |
| 2,485,503 | A | | 10/1949 | Misch |

(Continued)

FOREIGN PATENT DOCUMENTS

| | | |
|---|---|---|
| GB | 590517 A | 7/1947 |
| GB | 1 220 054 | 1/1971 |

(Continued)

OTHER PUBLICATIONS

International Search Report and Written Opinion for PCT/US2012/067982 mailed Apr. 29, 2013.

*Primary Examiner* — Thai Ba Trieu
(74) *Attorney, Agent, or Firm* — Merchant & Gould P.C.

(57) ABSTRACT

An air supply system is provided that uses two sets of rotors on a common set of shafts to boost air in two stages. The air supply system includes a housing and a first and a second rotatable shaft at least partially within the housing. A first and a second pair of rotors are included. Each pair of rotors has a first rotor supported for rotation on the first shaft and a second rotor supported for rotation on the second shaft. The housing has an inlet at the first pair of rotors, an outlet at the second pair of rotors, and an internal chamber between the first and the second pairs of rotors. Air flow from the inlet to the outlet thereby has a first pressure boost from the inlet to the internal chamber and a second pressure boost from the inlet chamber to the outlet.

16 Claims, 5 Drawing Sheets

(51) Int. Cl.

| | |
|---|---|
| *F04C 18/18* | (2006.01) |
| *F04B 17/00* | (2006.01) |
| *F04B 25/00* | (2006.01) |
| *F02B 33/38* | (2006.01) |
| *F02B 39/10* | (2006.01) |
| *F04D 25/06* | (2006.01) |
| *F04C 18/12* | (2006.01) |
| *H01M 8/04* | (2006.01) |
| *F04C 23/00* | (2006.01) |
| *F04C 23/02* | (2006.01) |
| *F02B 29/04* | (2006.01) |

(56) References Cited

U.S. PATENT DOCUMENTS

| | | | |
|---|---|---|---|
| 2,804,260 A * | 8/1957 | Nilsson et al. | 418/201.1 |
| 2,937,807 A * | 5/1960 | Lorenz | 418/9 |
| RE25,567 E * | 5/1964 | Lorenz | 418/9 |
| 3,141,604 A * | 7/1964 | Williams | 417/203 |
| 3,209,990 A | 10/1965 | Akerman | |
| 3,467,300 A * | 9/1969 | Schibbye | 418/201.1 |
| 3,481,532 A * | 12/1969 | Fraser | 418/203 |
| 3,667,874 A * | 6/1972 | Weatherston et al. | 418/9 |
| 3,922,117 A * | 11/1975 | Weatherston | 418/9 |
| 4,724,817 A * | 2/1988 | Cook | 123/565 |
| 4,859,158 A * | 8/1989 | Weinbrecht | 418/9 |
| 4,934,908 A * | 6/1990 | Turrell et al. | 418/9 |
| 4,960,370 A * | 10/1990 | Obrist et al. | 418/9 |
| 4,995,796 A * | 2/1991 | Kambe et al. | 418/9 |
| 5,378,128 A * | 1/1995 | Yanagisawa | 418/9 |
| 5,890,468 A | 4/1999 | Ozawa | |
| 6,209,528 B1 * | 4/2001 | Kondo | 123/565 |
| 6,284,397 B1 | 9/2001 | Barton | |
| 6,884,050 B2 * | 4/2005 | Prior | 418/201.1 |
| 7,140,846 B2 * | 11/2006 | Yamamoto et al. | 418/201.1 |
| 7,255,541 B2 * | 8/2007 | Kuramoto et al. | 417/410.3 |
| 7,478,629 B2 | 1/2009 | del Valle Bravo et al. | |
| 7,726,285 B1 * | 6/2010 | Hansen et al. | 123/559.1 |
| 7,806,649 B2 | 10/2010 | Ishikawa et al. | |
| 8,141,360 B1 * | 3/2012 | Huber | 290/40 B |
| 8,256,403 B2 * | 9/2012 | Hansen et al. | 123/559.1 |
| 8,539,769 B2 * | 9/2013 | Hansen et al. | 123/559.1 |
| 8,550,057 B2 * | 10/2013 | Prior | 123/559.1 |
| 2003/0115876 A1 | 6/2003 | Shaffer | |
| 2004/0247461 A1 | 12/2004 | Pflueger et al. | |
| 2007/0036662 A1 * | 2/2007 | Pesola et al. | 417/350 |
| 2008/0193301 A1 * | 8/2008 | Fujii et al. | 418/9 |
| 2009/0288648 A1 * | 11/2009 | Prior et al. | 123/559.1 |
| 2012/0025542 A1 * | 2/2012 | Schaaf et al. | 123/561 |
| 2012/0328969 A1 * | 12/2012 | DeWald et al. | 429/455 |
| 2014/0224228 A1 * | 8/2014 | Benjey et al. | 123/559.3 |
| 2014/0283797 A1 * | 9/2014 | Eybergen et al. | 123/559.1 |
| 2015/0047617 A1 * | 2/2015 | Benjey et al. | 123/559.3 |

FOREIGN PATENT DOCUMENTS

| | | |
|---|---|---|
| JP | 2091421 A | 3/1990 |
| JP | 7-259575 | 10/1995 |

* cited by examiner

AIR SUPPLY SYSTEM WITH TWO-STAGE ROOTS BLOWER

TECHNICAL FIELD

The present teachings generally include an air supply system having a blower with two sets of rotors.

BACKGROUND

Energy efficient engines of reduced size are desirable for fuel economy and cost reduction. Smaller engines provide less torque than larger engines. A supercharger is sometimes used to increase torque available from an engine. The supercharger provides additional air to the engine intake manifold, boosting torque provided, especially at low engine speeds.

SUMMARY

An air supply system is provided that uses two sets of rotors on a common set of shafts to boost air in two stages. The air supply system includes a housing and a first and a second rotatable shaft at least partially within the housing. A first and a second pair of rotors are included. Each pair of rotors has a first rotor supported for rotation on the first shaft and a second rotor supported for rotation on the second shaft. The housing has an inlet at the first pair of rotors, an outlet at the second pair of rotors, and an internal chamber between the first and the second pairs of rotors. Air flow from the inlet to the outlet thereby has a first pressure boost from the inlet to the internal chamber and a second pressure boost from the inlet chamber to the outlet. If an outlet is provided at the internal chamber, then air can be supplied from the housing at a pressure determined by the first pressure boost as well. A motor can drive the first shaft or it can be driven by a belt drive.

The above features and advantages and other features and advantages of the present teachings are readily apparent from the following detailed description of the best modes for carrying out the present teachings when taken in connection with the accompanying drawings.

DETAILED DESCRIPTION

Figure 1:
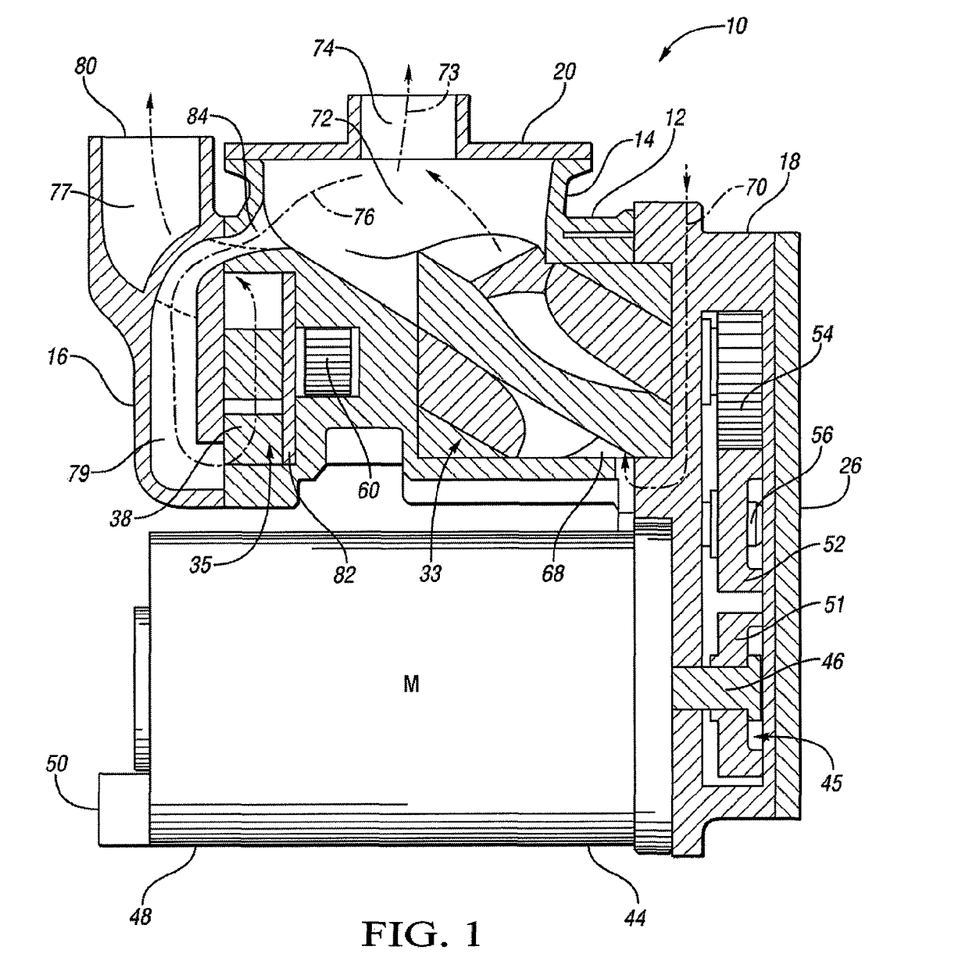
FIG. 1 is a schematic illustration in partial cross-sectional view of a first embodiment an air supply system taken at the lines 1-1 in FIG. 3.
Figure 2:
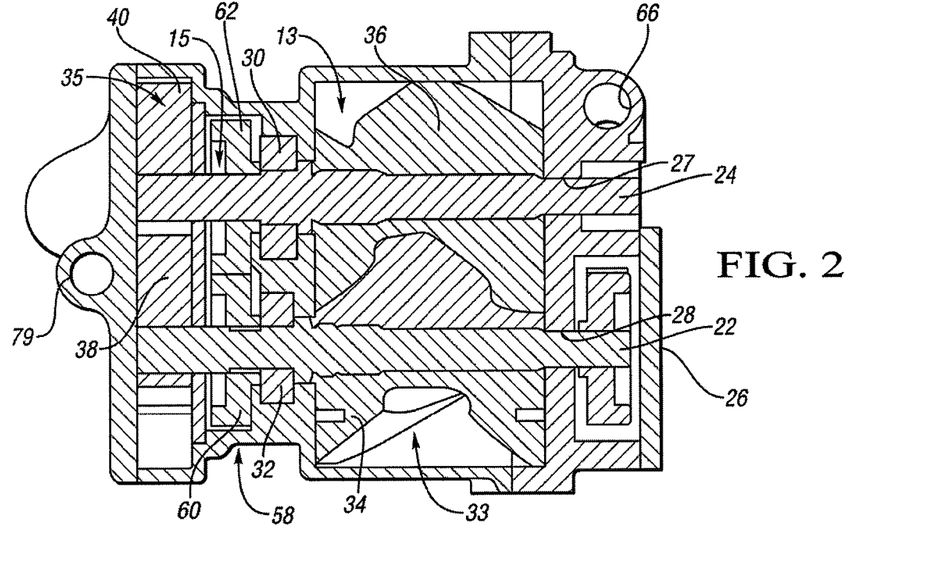
FIG. 2 is a schematic illustration in cross-sectional view of the air supply system of FIG. 1 taken at the lines 2-2 in FIG. 3.

Referring to the drawings, wherein like reference numbers refer to like components throughout the several views, FIG. 1 shows an air supply system 10 that is configured to provide a two-stage pressure boost to air flow. The air supply system 10 includes a multi-piece housing 12. The housing 12 includes a middle housing portion 14, a first closure 16, a second closure 18, and a third closure 20. The housing 12 forms a first generally cylindrical chamber 13 and a second generally cylindrical chamber 15, shown in FIG. 2. The housing 12 supports a first rotatable shaft 22 and a second rotatable shaft 24 arranged substantially parallel to the first rotatable shaft 22. The shafts 22 and 24 extend through both chambers 13, 15. A cover 26 covers the end of the first rotatable shaft 22 and is attached to the second closure 18, as shown in FIGS. 1 and 2. The cover 26 is removed in FIG. 3. The first shaft 22 and the second shaft 24 extend through openings 27, 28 in the second closure 18 and are supported by the middle housing portion 14 at bearings 30, 32. Additionally, needle bearings or other suitable bearings (not shown), are positioned between the first shaft 22 and the second closure 18 and between the second shaft 24 and the second closure 18, respectively.

The first and second shafts 22, 24 support a first pair of rotors 33 and a second pair of rotors 35. The first pair of rotors 33 is in the first chamber 13 and the second pair of rotors 35 is in the second chamber 15. The first pair of rotors 33 includes a first rotor 34 mounted on the first shaft 22 for rotation with the first shaft 22. The first pair of rotors 33 also includes a second rotor 36 mounted on the second shaft 24 for rotation with the second shaft 24. The second pair of rotors 35 includes a first rotor 38 mounted on the first shaft 22 for rotation with the first shaft 22 and a second rotor 40 mounted on the second shaft 24 for rotation with the second shaft 24.

In one embodiment, each rotor 34, 36, 38, 40 contains multiple helical lobes and the air supply system 10 is a fixed displacement supercharger assembly for an engine, such as a Roots-type blower (also referred to as a Roots blower), that outputs a fixed volume of air per rotation of the first pair of rotors 33 and another fixed volume of air per rotation of the second pair of rotors 35. The output of the first pair of rotors 33 is at a first flow rate and the output of the second pair of rotors 35 is at a second flow rate as the sets of rotors 33, 35 rotate at the same speed. A Roots-type blower is a volumetric device, and therefore is not dependent on rotational speed in order to develop pressure. The air output of each pair of rotors 33, 35 then becomes pressurized when forced into the housing 12. The volume of air delivered by a Roots-type blower per each rotation of the supercharger rotors is constant (i.e., does not vary with speed). Because the Roots-type blower functions as a pump rather than as a compressor, a Roots-type blower can be used as a supercharger on an engine, and can develop pressure at low engine speeds. Compression of the air delivered by the Roots-type blower takes place downstream of each pair of rotors 33, 35. For example, the middle portion 14 of the housing 12 causes compression of air exiting the first pair of rotors 33. The first closure 16 of the housing 12 causes compression of the air exiting the second pair of rotors 35. Alternatively, the second pair of rotors 35 could be configured as a compressor, such as a centrifugal-type supercharger that compresses the air as it passes through the rotors. A compressor-type supercharger must be run at higher speeds to deliver a desired pressure boost.

The first shaft 22 is driven by an electric motor 44 through a gear train 45. The electric motor 44 is labeled M in FIG. 1 and is shown in only partial cross-sectional view as having a rotor shaft 46 shown in cross-section, with a motor cover 48 not in cross-section. A stator, a rotor, electrical windings, and other motor components known to those skilled in the art are contained within the motor cover 48 and are operable to rotate the motor shaft 46. A motor controller 50 is shown schematically as mounted to the motor cover 48 to be integrated with the motor 44. Alternatively, the motor controller 50 may be mounted elsewhere and in operative connection to the motor 44 by electrical conductors. The motor controller 50 causes a power source, such as a battery, to power the motor 44 when additional air flow to an air consuming component, such as an engine, is required.

The gear train 45 includes a first gear 51, a second gear 52, and a third gear 54. The first gear 51 is mounted on the motor shaft 46 for rotation with the motor shaft 46. The second gear 52 meshes with the first gear 51 and is mounted on a hub 56 extending from the second closure 18 of the housing 12. The third gear 54 meshes with the second gear 52 and is mounted on the first shaft 22 for rotation with the first shaft 22. The motor 44 powers the first shaft 22 through the gear train 45.

A single set of intermeshing timing gears 58 shown in FIG. 2 is used to transfer rotational movement of the first shaft 22 to the second shaft 24. The timing gears 58 include first timing gear 60 mounted on the first shaft 22 for rotation with the first shaft 22. The first timing gear 60 meshes with a second timing gear 62, which is mounted on the second shaft 24 for rotation with the second shaft 24. Because the first rotors 34, 38 of the sets of rotors 33, 35 are mounted for rotation on the same first shaft 22, and the second rotors 36, 40 of the sets of rotors 33, 35 are mounted for rotation on the second shaft 24, only a single set of timing gears 58 is needed to transfer rotational torque from the first shaft 22 to the second shaft 24. By avoiding a separate set of timing gears for each pair of rotors 33, 35, the air supply system 10 achieves a smaller axial width and a reduction in components.

The housing 12 and sets of rotors 33, 35 are configured so that the first pair of rotors 33 functions as a first stage Roots-type blower, and the second pair of rotors 35 functions as a second stage Roots-type blower. That is, air flow through the housing 12 undergoes a two-stage pressure boost. The housing 12 is configured so that air delivered by the first pair of rotors 33 undergoes a first pressure boost after exiting the first pair of rotors 33. As explained below, at least a portion of the air delivered by the first pair of rotors 33 then flows through the second pair of rotors 35 and undergoes a second pressure boost.

Figure 3:
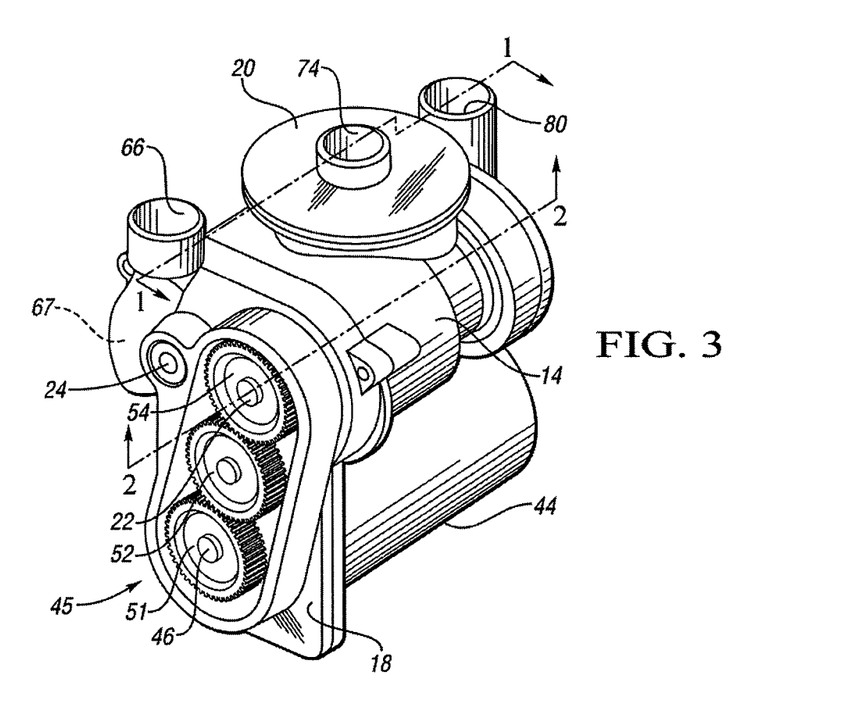
FIG. 3 is a schematic illustration in perspective view of the air supply system of FIGS. 1 and 2.

Air enters the air supply system 10 through an air inlet 66 formed in the second closure 18. As shown in FIG. 3, the air inlet 66 is on an upper side of the housing 12. The second closure 18 forms a passage 67 that directs air flow from the inlet 66 to an entrance area 68 of the chamber 13 containing the first pair of rotors 34, 36. As best shown in FIG. 3 and in the schematic of FIG. 5, the passage 67 directs inlet air on a side of the rotor 34 closest to the motor 44. Air flow from the inlet 66 to the entrance area 68 is represented in FIG. 1 by arrow 70. Rotation of the rotors 34, 36 delivers a fixed volume of the air to an internal chamber 72 formed in the housing 12. The internal chamber 72 is at an air flow exit of the first pair of rotors 33. The air flow pumped into the housing 12 by the first pair of rotors 33 and air pressure upstream of the internal chamber 72 causes the pressure of the air at the internal chamber 72 to be greater than the pressure at entrance area 68. The first pair of rotors 33 and housing 12 thereby create a first pressure boost of the air from the entrance area 68 to the internal chamber 72 in a ratio of the air pressure $P_1$ in the internal chamber 72 to the air pressure $P_0$ at the entrance area 68. The air pressure $P_0$ may be atmospheric pressure.

Figure 5:
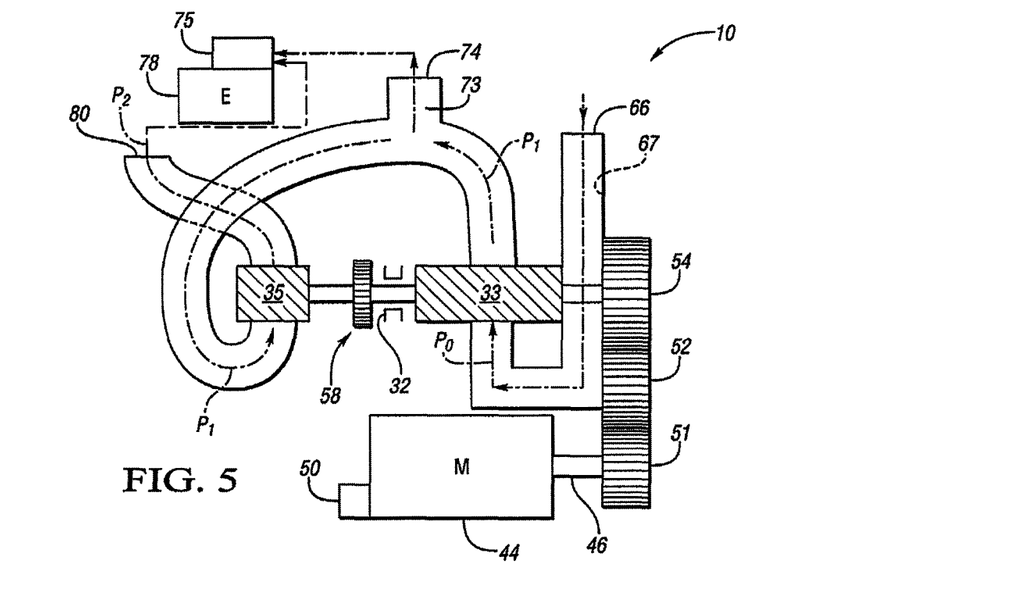
FIG. 5 is a schematic illustration of the air supply system of FIG. 1 illustrating air flow.

In the embodiment of FIG. 1, the third housing portion 20 forms an intermediate outlet 74, also referred to herein as an additional outlet, at which a portion 73 of the air flow pumped through the first pair of rotors 33 having the first pressure $P_1$ may be supplied to an air-consuming component, as shown in FIG. 5. For example, the air at outlet 74 may be supplied to an air intake manifold 75 of an engine 78 (labeled E), as shown schematically in FIG. 5. As used herein, an "engine" can be an internal combustion engine, a diesel engine, a fuel cell, or any other known power plant. In one embodiment, the engine 78 is a solid oxide fuel cell or a polymer electrolyte membrane (PEM) fuel cell, also referred to as a proton exchange membrane fuel cell. Such fuel cells can require air flow at two different pressures, as provided by the air supply systems 10 and 210 described herein.

The internal chamber 72 is configured so that a fixed volume of the air flow 76 proceeds through an internal inlet 84 to a passage 79 that leads to the second pair of rotors 35. The air flow enters the pair of rotors 35 and a fixed volume per rotation of the shafts 22, 24 is delivered from the second pair of rotors 35 to an exit passage 77 leading to an outlet 80. The exit passage 77 extends from the second pair of rotors 35 at a different cross-section than the passage 79, passing under the passage 79 in the cross-section of FIG. 1, as indicated with hidden lines. The outlet 80 can also be in fluid communication with the air intake manifold 75 of the engine 78 of FIG. 5 through passages or ducts. One or more valves (not shown) between the outlets 74, 80 controls which outlet 74, 80 provides air flow to the manifold 75. The engine 78 can be an internal combustion engine. The air supply system 10 can be used for supplying air to the internal combustion engine 78 from the intermediate outlet 74 at the first pressure $P_1$ when less engine output torque is required, such as at higher engine speeds. The air supply system 10 can be used to supply air to the engine 78 at the higher second pressure $P_2$ from the outlet 80 at lower speeds when high torque is required, such as when accelerating at low vehicle speeds.

An intermediate plate 82 mounted to the middle housing portion 14 between the timing gears 60 and the second pair of rotors 35 establishes a high pressure seal barrier to prevent air from leaking past the face of the second pair of rotors 35 into the timing gear chamber in which the timing gears are positioned. The size of the internal inlet 84, the size of the outlet 74 and the dimensions and shape of the internal chamber 72 determine the portion 76 of air flow that proceeds to the second pair of rotors 35 through the internal inlet 84. A fixed volume of air flow per revolution of the pairs of rotors 33, proceeds to the second pair of rotors 35.

As indicated in FIG. 5, the volume of air flow delivered to the first outlet 80 by the second pair of rotors 35 undergoes a second pressure boost in a ratio of the air pressure $P_2$ in the passage 77 to the air pressure $P_1$ in the passage 79. Thus, the air supply system 10 provides air at two different pressures $P_1$ and $P_2$ through the separate outlets 74, 80. A heat exchanger similar to that of FIG. 7 may be positioned adjacent to the internal chamber 72 to cool the air in the internal chamber 72 prior to the portion 76 of the air passing to the second pair of rotors 35.

Figure 4:
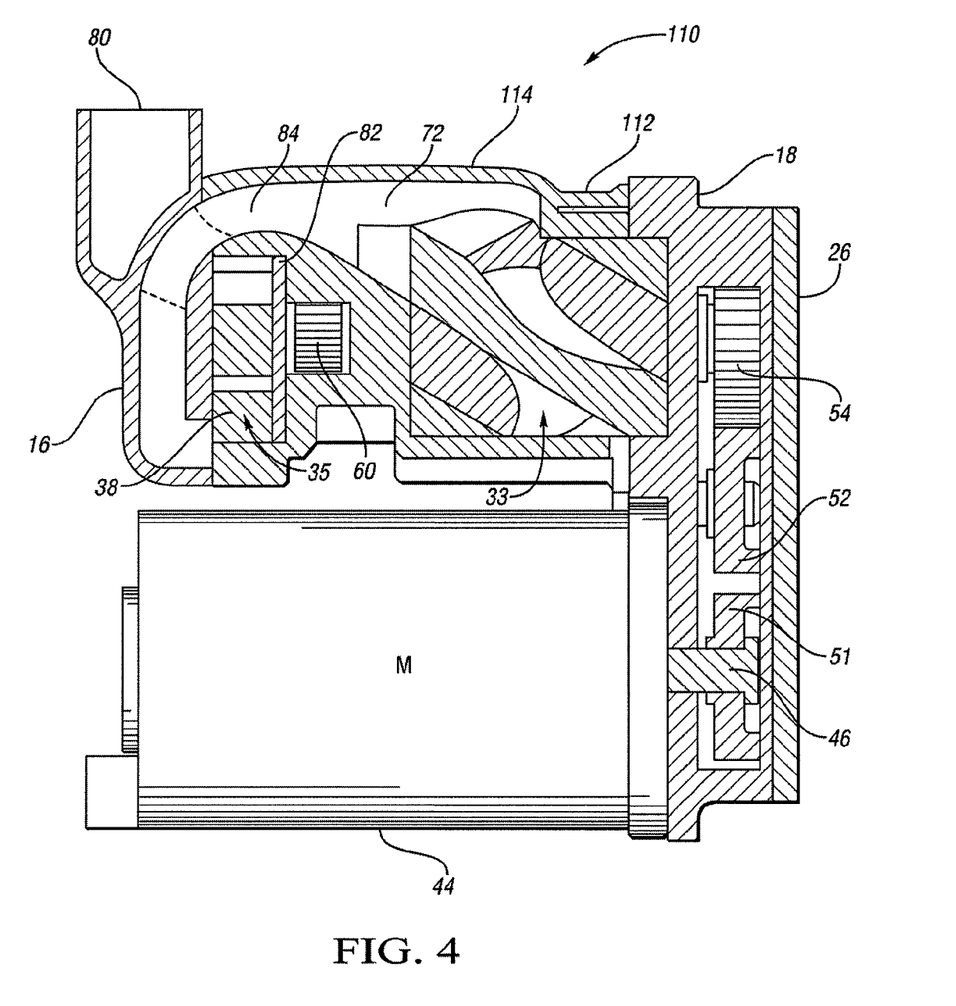
FIG. 4 is a schematic illustration in partial cross-sectional view of a second embodiment of an air supply system.

For some applications, air flow at a pressure $P_2$ that has been boosted in two stages is required, but air flow at the intermediate pressure P1 is not required. FIG. 4 shows an alternative embodiment of an air supply system 110 alike in many aspects to the air supply system 10 of FIG. 1, except that there is no intermediate outlet in fluid communication with the internal chamber 72. The middle portion 114 of the housing 112 is closed, or a third closure is used to close the middle portion 114. In either case, there is no outlet between the two sets of rotors 33, 35 at the internal chamber 72. Instead, the internal chamber 72 functions as a passage that directs all of the air that has flowed past the first pair of rotors 33 to the internal inlet 84 and past the second pair of rotors 35. All air flow at the outlet 80 is boosted to the pressure $P_2$ from the original inlet pressure $P_0$. The air flow is first boosted to pressure P1 in the internal chamber 72, and then further boosted to pressure P2 at the outlet 80.

Figure 6:
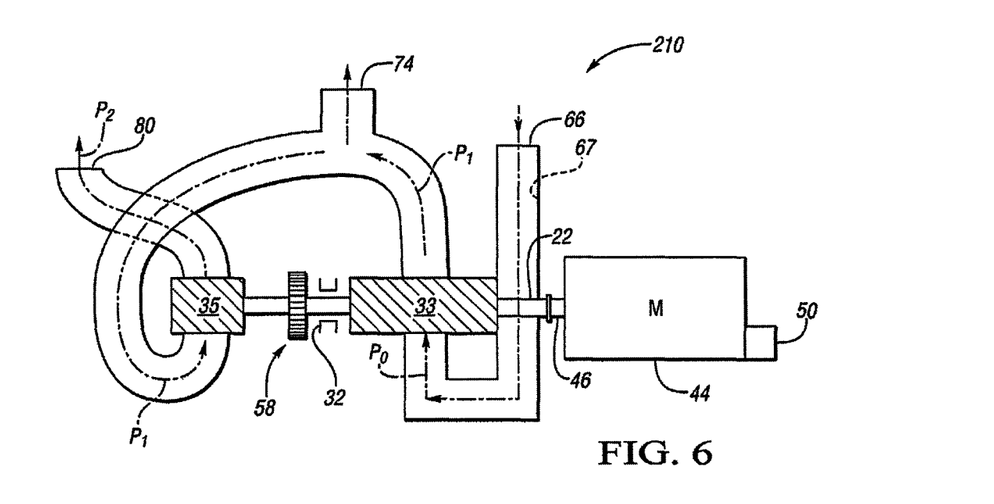
FIG. 6 is a schematic illustration of a third embodiment of an air supply system.

FIG. 6 shows another embodiment of an air supply system 210 similar in all respects to the air supply system 10 of FIG. 1 except that the electric motor 44 is positioned with the motor shaft 46 parallel with and directly driving the first shaft 22. The air supply system 210 takes up a larger axial packaging space, but has a smaller depth. Packaging requirements for some applications may be better suited for this design. Because the motor 44 is mounted to directly drive the first shaft 22, the gear train 45 of the air supply system 10 of FIG. 1 is not required. The second closure 18 can thus be smaller and a gear train cover 26 is not required.

Figure 7:
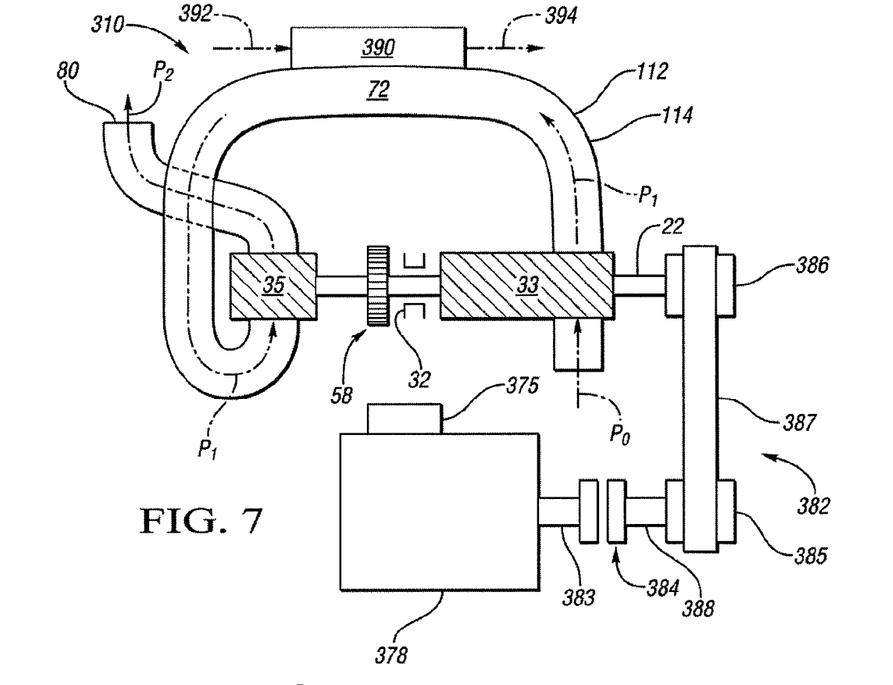
FIG. 7 is a schematic illustration a fourth embodiment of an air supply system driven by an engine through a belt drive.

FIG. 7 shows an air supply system 310 similar to the air supply system 110 of FIG. 4 except that the first shaft 22 is driven by an engine 378 through a belt drive 382. Air flowing out of the outlet 80 is directed to the engine manifold 375 by passages (not shown). No electric motor is included in the air supply system 310. The engine 378 can be but is not limited to a non-hybrid diesel engine in this embodiment. The engine 378 has a crankshaft 383 that is selectively connected to the belt drive 382 by engagement of a clutch 384. When the clutch 384 is engaged, the crankshaft 383 transfers torque to the first shaft 22 through a belt 387 and a set of pulleys 385, 386 mounted for rotation with a belt drive shaft 388 and the first shaft 22, respectively. The belt drive shaft 388 rotates with the crankshaft 383 when the clutch 384 is engaged. The belt drive shaft 388 and pulleys 385, 386 are supported by a stationary member, such as the engine block, on bearings. Engine belt drive systems are readily understood by those skilled in the art.

The air supply system 310 also includes a heat exchanger 390 in thermal communication with the middle housing portion 114. The heat exchanger 390 has passages that enable constant coolant flow from an inlet to an outlet. Inlet coolant flow 392 is shown entering the heat exchanger 390 and outlet coolant flow 394 exits the heat exchanger 390. The coolant flow constantly cools the internal chamber 72 of the adjacent middle housing portion 114. Reducing the temperature of the internal chamber 72 results in a lower output temperature at outlet 80, which is preferred for high-efficiency combustion.

Figure 8:
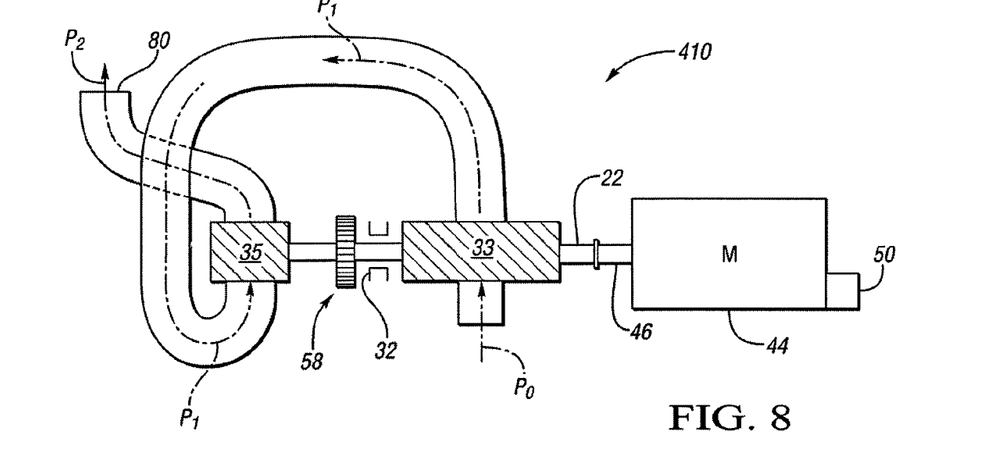
FIG. 8 is a schematic illustration of a fifth embodiment of an air supply system.

FIG. 8 shows another embodiment of an air supply system 410 similar in all respects to the air supply system 110 of FIG. 4 except that the electric motor 44 is positioned with the motor shaft 46 parallel with and directly driving the first shaft 22. The air supply system 410 takes up a larger axial packaging space, but has a smaller depth. Packaging requirements for some applications may be better suited for this design. Because the motor 44 is mounted to directly drive the first shaft 22, the gear train 45 of the air supply system 110 of FIG. 4 is not required. The second closure 18 can thus be smaller and a gear train cover 26 is not required. The air supply system 410 can be used to provide air flow at the two-stage pressure boost to a diesel hybrid engine, although its use is not limited to this application.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An air supply system comprising:
  a housing;
  a first and a second rotatable shaft at least partially within the housing;
  a first and a second pair of rotors, each pair of rotors having a first rotor supported for rotation on the first shaft and a second rotor supported for rotation on the second shaft; and
  wherein the housing has an inlet at the first pair of rotors, an outlet at the second pair of rotors, and an internal chamber between the first and the second pairs of rotors, air flow from the inlet to the outlet thereby having a first pressure boost from the inlet to the internal chamber and a second pressure boost from the internal chamber to the outlet;
  wherein the housing has an additional outlet at the internal chamber at which a portion of the air flow exits the housing after the first pressure boost by the first pair of rotors without flowing to the second pair of rotors.

2. The air supply system of claim 1, wherein at least one of the pairs of rotors is configured as a Roots-type blower.

3. The air supply system of claim 1, wherein the housing includes an intermediate plate configured to at least partially seal a chamber in which the second pair of rotors is positioned.

4. The air supply system of claim 1, further comprising:
  an electric motor operatively connected to the first shaft and operable to drive rotation of the first shaft.

5. The air supply system of claim 4, further comprising:
  a gear train operatively connecting the electric motor to the first shaft so that the electric motor drives rotation of the first shaft through the gear train.

6. The air supply system of claim 4, wherein the housing is configured to support the electric motor so that a motor shaft of the electric motor is arranged substantially parallel with the first shaft and the second shaft.

7. The air supply system of claim 4, further comprising:
  a motor controller integrated with the electric motor.

8. The air supply system of claim 1, further comprising:
  a heat exchanger in fluid communication with the internal chamber and operable to cool the air in the internal chamber.

9. The air supply system of claim 1, further comprising:
  only one set of intermeshing timing gears operatively connecting the first shaft and the second shaft.

10. A supercharger assembly for an engine having an air intake comprising:
  a housing;
  a first and a second rotatable shaft at least partially within the housing;
  a first and a second pair of rotors, each pair of rotors having a first rotor supported for rotation on the first shaft and a second rotor supported for rotation on the second shaft;
  wherein each pair of rotors is configured to deliver a respective predetermined volume of air per rotation of the shafts;
  wherein the housing has an inlet at the first pair of rotors, a first outlet at the second pair of rotors and an internal chamber that directs air flow from the first pair of rotors to the second pair of rotors; and wherein the first outlet is configured to be operatively connectable to the air intake of the engine; the supercharger assembly thereby providing air flow to the engine that undergoes a first pressure boost from the inlet to the internal chamber and a second pressure boost from the internal chamber to the outlet;
  wherein the engine is an internal combustion engine; and wherein the housing defines an intermediate outlet at the passage between the first pair of rotors and the second pair of rotors and that is operatively connectable to the air intake of the engine, air flow with the first pressure boost thereby available to the engine from the intermediate outlet and air flow with both the first pressure boost and the second pressure boost thereby available to the engine from the first outlet.

11. The supercharger assembly of claim 10, wherein the engine is a diesel engine; and wherein the housing directs substantially all of the air flow delivered in the passage from the first pair of rotors to the first outlet through the second pair of rotors.

12. The supercharger of claim 10, wherein the engine has a crankshaft; and further comprising:
a belt operatively connecting the crankshaft and the first shaft; and wherein the crankshaft drives the first shaft via the belt.

13. The supercharger of claim 10, further comprising:
an electric motor operatively connected to the first shaft; and wherein the electric motor drives the first shaft.

14. The supercharger of claim 10, further comprising:
a heat exchanger in fluid communication with the internal chamber and operable to cool the air in the internal chamber.

15. The supercharger of claim 10, further comprising:
only one set of intermeshing timing gears operatively connecting the first shaft and the second shaft.

16. An air supply system comprising:
a housing;
a first and a second rotatable shaft at least partially within the housing;
a first and a second pair of rotors within the housing, each pair of rotors having a first rotor supported for rotation on the first shaft and a second rotor supported for rotation on the second shaft;
a single pair of intermeshing timing gears operatively connecting the first shaft and the second shaft;
a gear train;
an electric motor operatively connected to the first shaft through the gear train and operable to drive rotation of the first shaft;
wherein the housing has an air inlet at the first pair of rotors, an internal chamber extending between the first and the second pairs of rotors, a first outlet at the internal chamber, and a second outlet across the second pair of rotors from the internal chamber, air flow from the inlet to the first outlet having a first pressure boost and air flow from the internal chamber to the second outlet having an additional pressure boost; and
a fuel cell operatively connected to the housing to receive air flow from both the first outlet and the second outlet.

* * * * *